United States Patent
Ji et al.

(10) Patent No.: US 8,285,714 B2
(45) Date of Patent: Oct. 9, 2012

(54) METHOD AND APPARATUS FOR PROVIDING RELATED WORDS FOR QUERIES USING WORD CO-OCCURRENCE FREQUENCY

(75) Inventors: Hyungsuk Ji, Suwon-si (KR);
Hyunseung Choo, Gwacheon-si (KR)

(73) Assignee: Sungkyunkwan University Foundation for Corporate Collaboration, Suwon-si, Gyeonggi-do (KR)

( * ) Notice: Subject to any disclaimer, the term of this patent is extended or adjusted under 35 U.S.C. 154(b) by 354 days.

(21) Appl. No.: 12/392,070

(22) Filed: Feb. 24, 2009

(65) Prior Publication Data
US 2010/0191747 A1    Jul. 29, 2010

(30) Foreign Application Priority Data
Jan. 29, 2009    (KR) ................. 10-2009-0007121

(51) Int. Cl.
*G06F 17/30* (2006.01)
(52) U.S. Cl. ..................................... 707/728
(58) Field of Classification Search ............ 707/727, 707/728, 731
See application file for complete search history.

(56) References Cited

U.S. PATENT DOCUMENTS
6,564,213 B1 *   5/2003   Ortega et al. ................ 1/1

FOREIGN PATENT DOCUMENTS
| JP | 11265399 A | 9/1999 |
| JP | 2000242662 A | 9/2000 |
| JP | 2000-331032 | 11/2000 |
| KR | 1019970076328 A | 7/1999 |

OTHER PUBLICATIONS

Office Action from Korean Patent Office for foreign counterpart Korean Patent Application No. 10-2009-0007121, 9 pgs., (Nov. 19, 2010).

Notice of Allowance from Korean Patent Office for foreign counterpart Korean Patent Application No. 10-2009-0007121, 3 pgs., Jul. 19, 2011.

* cited by examiner

*Primary Examiner* — Rehana Perveen
*Assistant Examiner* — Alexander Khong
(74) *Attorney, Agent, or Firm* — Blakely, Sokoloff, Taylor & Zafman LLP

(57) ABSTRACT

A system and a method is provided for extracting, classifying, and displaying related words for a query, if an internet or local computer or a mobile appliance user inputs the query. In a system for providing related words composed of a client and a server connected to the client through a network, the method of providing related words for a query includes the steps of the server searching for the co-occurrence frequency by words from source data, the server storing the result of the search in a database, the server receiving an input of a query from the client, and the server extracting related words related to the input query from the database.

22 Claims, 6 Drawing Sheets

FIG. 5

| |
|---|
| ⋮ |
| Iraq:4000, [ Iraq War:2000, Country:1900, Bush:1700, Baghdad:1400, Mesopotamia:1000, Middle East:800 ⋯] |
| ... |
| Iraq War:4300, [Iraq: 2000, Bush:2200, U.S.A.: 1200, Weapons of Mass Destruction:700 ⋯] |
| ... |
| Country:10000 [ Nation:7000, Sovereignty:4000, Territory:3000, People: 2000⋯.] |
| ... |
| Bush : 5000, [U.S.A.: 4000, President: 3100, Iraq: 1800, Iraq War: 1700..] |
| ... |
| Baghdad: 2000 [Iraq: 1700, Capital: 1400, Middle East: 500, Desert: 200⋯] |
| ... |
| Mesopotamia: 1500 [civilization: 1000, Iraq: 500 , Middle East: 300⋯] |
| ... |
| Middle East: 1000 [ Petroleum:600, Iraq:300, Desert:200, Baghdad:100, Mesopotamia:100..] |
| ... |

METHOD AND APPARATUS FOR PROVIDING RELATED WORDS FOR QUERIES USING WORD CO-OCCURRENCE FREQUENCY

BACKGROUND OF THE INVENTION

1. Field of the Invention

The present invention relates to a system and method for extracting, classifying, and displaying related words for a query if an internet or local computer or a mobile appliance user inputs the query.

2. Description of the Prior Art

As generally known in the art, a human, unlike a computer, may clearly recognize and remember the meaning and background of a specified word rather than clearly and accurately remembering the specified word, but may not clearly remember the surface word that is represented by the meaning and the background. For example, a human cannot clearly remember whether the target word is "vessel", "container", or "bucket", but can clearly recognize what it is.

In order to complement unstable human memories as described above, several methods for providing convenience when searching have been attempted in existing portal sites and search sites.

One of them is a query presenting function that is called a query auto-completion.

FIG. 1 is a view illustrating an example of the conventionally used query auto-completion.

This function shows multiple presented words including an input query through a drop-down menu even if a search user inputs only part of the query. The related queries are presented in the order of their similarity and frequency. Since this function enables search users to select a desired query among multiple queries presented by a search device even if the search user only knows only a part of the query, time required to input the queries can be reduced, and the user can conveniently conduct the searches.

For example, even if a user, who desires to search for "internet banking", inputs only "inter" on a search window, multiple queries starting with "inter", such as "internet", "internet phone", "internet banking", and the like, are marshalled, and thus the user can select the desired query. However, the above described query auto-completion has the problem that in order to achieve the search, the user should input the contents included in the query for which the user intends to search.

Another search function uses a synonym dictionary. That is, if the user inputs a certain query, this function marshals queries for the input query. However, in the case where they are actually similar to one another, the range of similarity gets over philological "meaning of a word" and "synonym". For example, although English words "accommodation" and "rent" are not synonymous, their meanings are relevant to each other.

Recently, related word functions that marshal queries related to a specified query if a user inputs the specified query have been proposed. However, the currently proposed related word functions are made on the basis of the user's keyword input.

FIG. 2 is a view illustrating an example of showing related words using a conventional method.

For example, if a user inputs a query of "Iraq" through a currently used search engine, "Iraq War", "Israel", "Russia", "U.S.A.", and the like, are marshalled together with the result of searching for "Iraq". Such related words are merely the marshalling of words subsequently searched by persons who have searched for "Iraq".

If a user, who desires to search for a specified U.S. President, does not remember his name or other information, but remembers that he was the U.S. President during the Iraq War, the user may input "Iraq" as a query to see the related words. However, according to the conventional method, it is impossible for the user to conduct the corresponding search because the related words are not prepared to have actual relations with one another, but are prepared on the basis of a certain search pattern in which users conduct subsequent searches after searching a certain word.

SUMMARY OF THE INVENTION

Accordingly, the present invention has been made to solve the above-mentioned problems occurring in the prior art, and an object of the present invention is to provide related words when a user inputs a reminder word, even though the user cannot clearly remember a specified word to be searched for, and to enable the user to select the actually desired word among the related words to conduct the full-dress search.

In order to accomplish this object, there is provided an apparatus for providing related words for a query, according to an embodiment of the present invention, which includes a communication module connected to an external client through a network to receive an input query from the client; a relational database storing data including at least one word, at least one co-occurrence word co-occurring by words, and co-occurrence frequency; and a related word control module extracting words included in source data by searching the source data, extracting and storing the co-occurrence words co-occurring by the extracted words and the co-occurrence frequency in the relational database, and extracting the query input through the communication module and related words from the relational database.

It is preferred that the related word control module includes: an occurrence frequency examination module extracting the words included in the source data by searching the source data, extracting and storing the co-occurrence words co-occurring by the extracted words and the co-occurrence frequency in the relational database; and an extraction module extracting the related words related to the input query from the relational database.

It is also preferred that the related word control module further includes a grouping module grouping the related words extracted by the extraction module on the basis of the co-occurrence frequency of the respective related words.

Further, it is preferred that the occurrence frequency examination module extracts the co-occurrence words and the number of co-occurrences with respect to the words only within a predefined range.

The predefined range may be any one of a sentence unit and a paragraph unit.

It is also preferred that the occurrence frequency examination module is executed for a predetermined period.

Moreover, it is preferred that the source data is any one of a web document and multiple corpuses, the communication module receives an input query and types of source data from the client, the relational database stores data including words and one or more co-occurrence words by types of the source data, and the related word control module extracts the related words related to the input query by types of the source data from the database.

Preferably, the related word control module further includes an advanced extraction module reading the co-occurrence words by words from the relational database, extracting related words related to the word among the co-occurrence words, and storing the extracted related words in the relational database.

Further, it is preferred that the advanced extraction module reads the co-occurrence words by specified words from the relational database, extracts N upper co-occurrence words by the specified words in the order of the co-occurrence frequency, extracts second co-occurrence words with respect to the N co-occurrence words when the co-occurrence words occur, and judges the co-occurrence word for the specified word as the related words if the specified word among the second co-occurrence words is within the order predetermined by the co-occurrence frequency order.

The apparatus may further include: a search database storing searched data; and a search engine performing a search in the search database using the query.

In accordance with another aspect of the present invention, there is provided a system for providing related words for a query, including: a client receiving a query from a user and transmitting the query through a network; and a server receiving the query from the client, extracting and transmitting related words related to the query to the client, the server including: a communication module connected to the external client through the network to receive an input of the query from the client; a relational database storing data including at least one word, at least one co-occurrence word co-occurring by words, and co-occurrence frequency; and a related word control module extracting words co-occurring by specified words from source data, storing the extracted words in the relational database, and extracting the related words related to the query input through the communication module from the database.

It is preferred that the related word control module includes: an occurrence frequency examination module extracting the words included in the source data by searching the source data, extracting and storing the co-occurrence words co-occurring by the extracted words and the co-occurrence frequency in the relational database; and an extraction module extracting the related words related to the input query from the relational database.

In accordance with another aspect of the present invention, there is provided a method of providing related words for a query using a search system for providing related words composed of a client and a server connected to the client through a network, the method including the steps of: the server searching for the co-occurrence frequency by words from source data; the server storing the result of the search in a database; the server receiving an input of a query from the client; and the server extracting related words related to the input query from the database.

It is preferred that the step of searching for the co-occurrence frequency extracts the words included in the source data by searching the source data, extracts and stores the co-occurrence words co-occurring by the extracted words and the co-occurrence frequency in the relational database.

The method may further include the step of grouping the extracted related words on the basis of the co-occurrence frequency of the respective related words.

It is also preferred that the step of searching for the co-occurrence frequency extracts the co-occurrence words and the number of co-occurrences with respect to the extracted words only within a predefined range.

Preferably, the predefined range may be any one of a sentence unit and a paragraph unit.

It is preferred that the step of searching for the co-occurrence frequency is executed for a predetermined period.

It is also preferred that the source data is any one of a web document and multiple corpuses, the step of storing the search result in the database stores data by types of the source data, the step of receiving the input receives the query and the types of the source data, and the step of extracting the related words extracts the related words related to the input query by types of the source data from the database.

In accordance with another aspect of the present invention, there is provided a method of providing related words for a query using a search system for providing related words composed of a client and a server connected to the client through a network, the method including the steps of: the server searching for the co-occurrence frequency by words from source data and storing the co-occurrence frequency in a database; the server extracting related words by words on the basis of the searched co-occurrence frequency; the server storing the extracted related words in the database; the server receiving an input of a query from the client; and the server extracting the related words related to the input query from the database.

It is preferred that the step of extracting the related words reads the co-occurrence words by specified words from the relational database, extracts N upper co-occurrence words by the specified words in the order of the co-occurrence frequency, extracts second co-occurrence words with respect to the N co-occurrence words when the co-occurrence words occur, and judges the co-occurrence word for the specified word as the related words if the specified word among the second co-occurrence words is within the order predetermined by the co-occurrence frequency order.

In accordance with another aspect of the present invention, there is provided an apparatus for providing related words for a query, including: an input module receiving a query from a user; a relational database storing data including at least one word, at least one co-occurrence word co-occurring by words, and co-occurrence frequency; and a related word control module extracting words included in source data by searching the source data, extracting and storing the co-occurrence words co-occurring by the extracted words and the co-occurrence frequency in the relational database, and extracting the query inputted through the communication module and related words from the relational database.

It is preferred that the related word control module includes: an occurrence frequency examination module extracting the words included in the source data by searching the source data, extracting and storing the co-occurrence words co-occurring by the extracted words and the co-occurrence frequency in the relational database; and an extraction module extracting the related words related to the input query from the relational database.

In accordance with another aspect of the present invention, there is provided a computer-readable recording medium recorded with a program in a system for providing related words for a query composed of a client and a server connected to the client through a network, the program including the steps of: the server searching for the co-occurrence frequency by words from source data; the server storing the result of the search in a database; the server receiving an input of a query from the client; and the server extracting related words related to the input query from the database.

With the above described construction, a user can conduct a desired search using the method provided according to the present invention through the reminder marshalling of related words when the user inputs a reminder word, even though the user cannot clearly remember a specified word to be searched for.

That is, both (1) in the case where the user does not even know the target word to be searched for and (2) in the case where the user knows the word but cannot remember the word at the time of the search, user's efforts required to enter into all the related web sites or related notice boards and search for information can be greatly reduced.

BRIEF DESCRIPTION OF THE DRAWINGS

The above and other objects, features and advantages of the present invention will be more apparent from the following detailed description taken in conjunction with the accompanying drawings, in which:

FIG. 5 is a view illustrating an example of data loaded on a relational database according to an embodiment of the present invention.

DETAILED DESCRIPTION OF THE PREFERRED EMBODIMENTS

Figure 1:
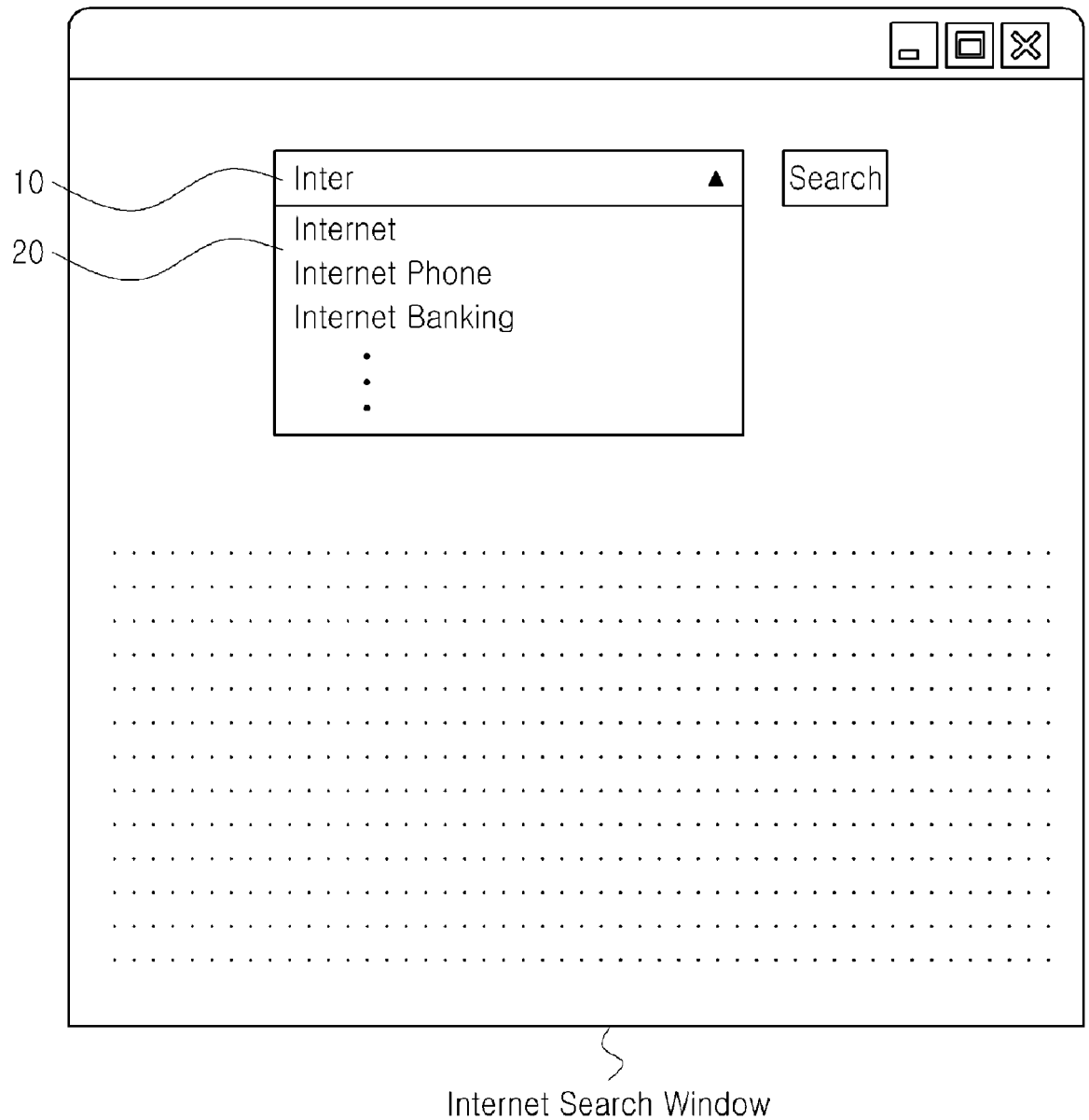
FIG. 1 is a view illustrating an example of the conventionally used query auto-completion.
Figure 2:
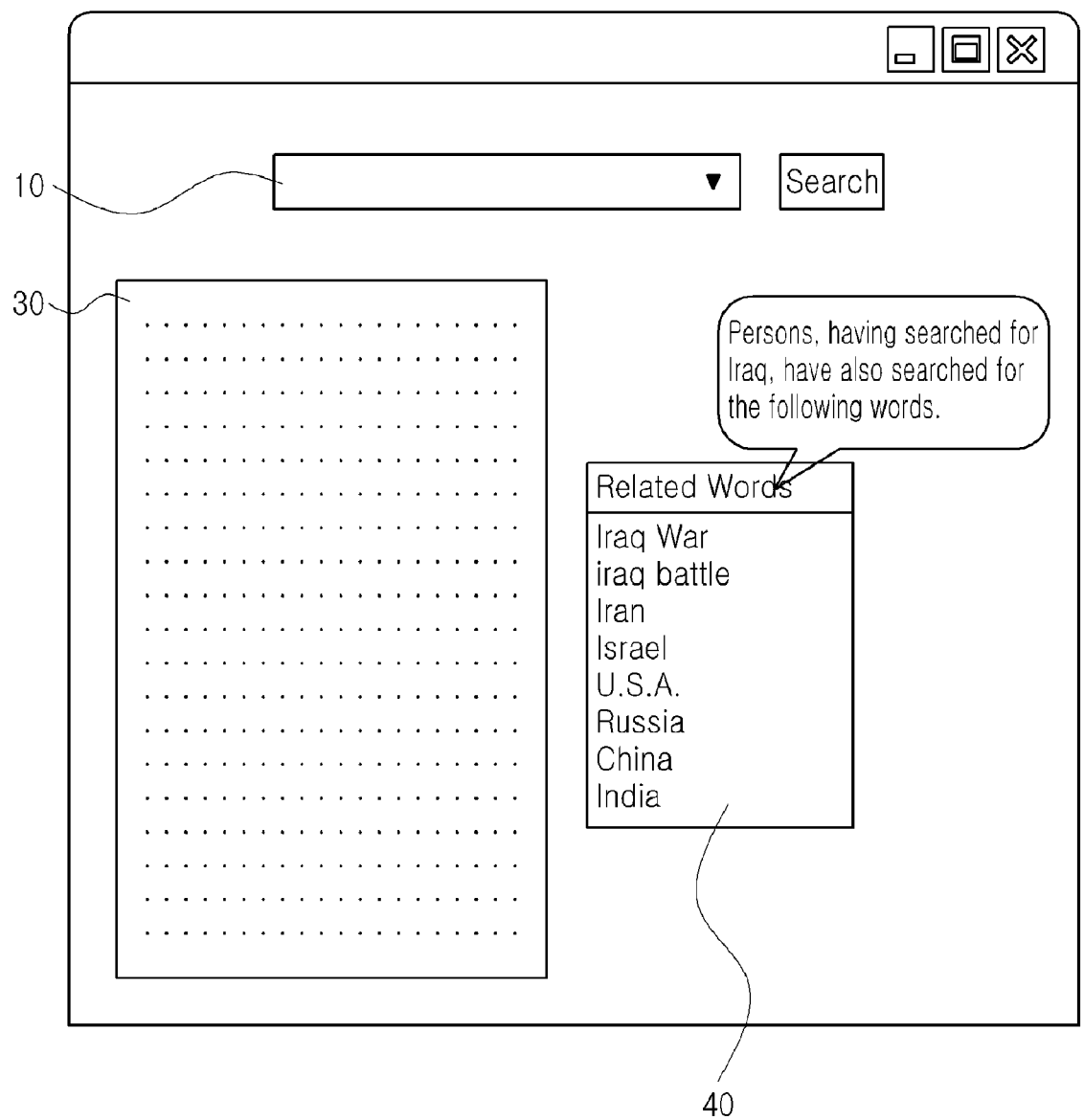
FIG. 2 is a view illustrating an example of showing related words using a conventional method.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 3:
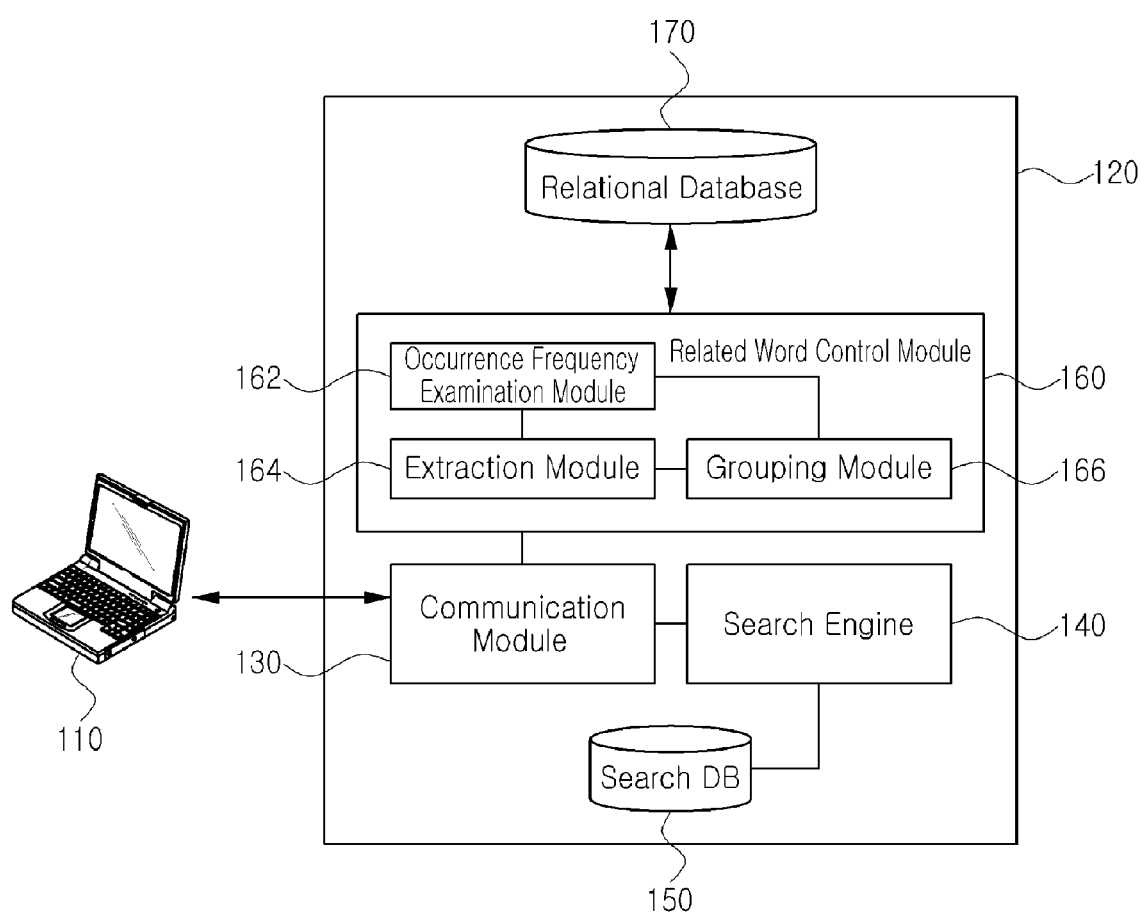
FIG. 3 is a block diagram illustrating the construction of a system for related words according to an embodiment of the present invention.

FIG. 3 is a block diagram illustrating the construction of a system for related words according to an embodiment of the present invention.

As illustrated in FIG. 3, a system 120 for related words according to an embodiment of the present invention includes a communication module 130 connected to a client 110 through a network to send/receive data for related words, a search database (DB) 150 storing search data, a search engine 140 performing the search in the search DB 150 using a query, a relational database (DB) 170 storing data to perform related search according to the present invention, and a related word control module 160 extracting the related words through the relational DB.

The related word control module 160 includes an occurrence frequency examination module 162 searching for the co-occurrence frequency by words from the source data and storing the searched information in the relational DB, an extraction module 164 extracting related words related to the query using the information stored in the relational DB 170, and a grouping module 166 grouping the related words extracted by the extraction module 164 in accordance with their relation.

Here, since the communication module 130, the search engine 140, and the search DB 150 are fundamental constitutional elements for deriving the search result for a general query, which can be easily known to a person of ordinary skill in the art, the detailed description thereof will be omitted.

Hereinafter, with reference to FIG. 4, a method of driving related words for a query through the related word control module 160 will be described in detail.

Figure 4:
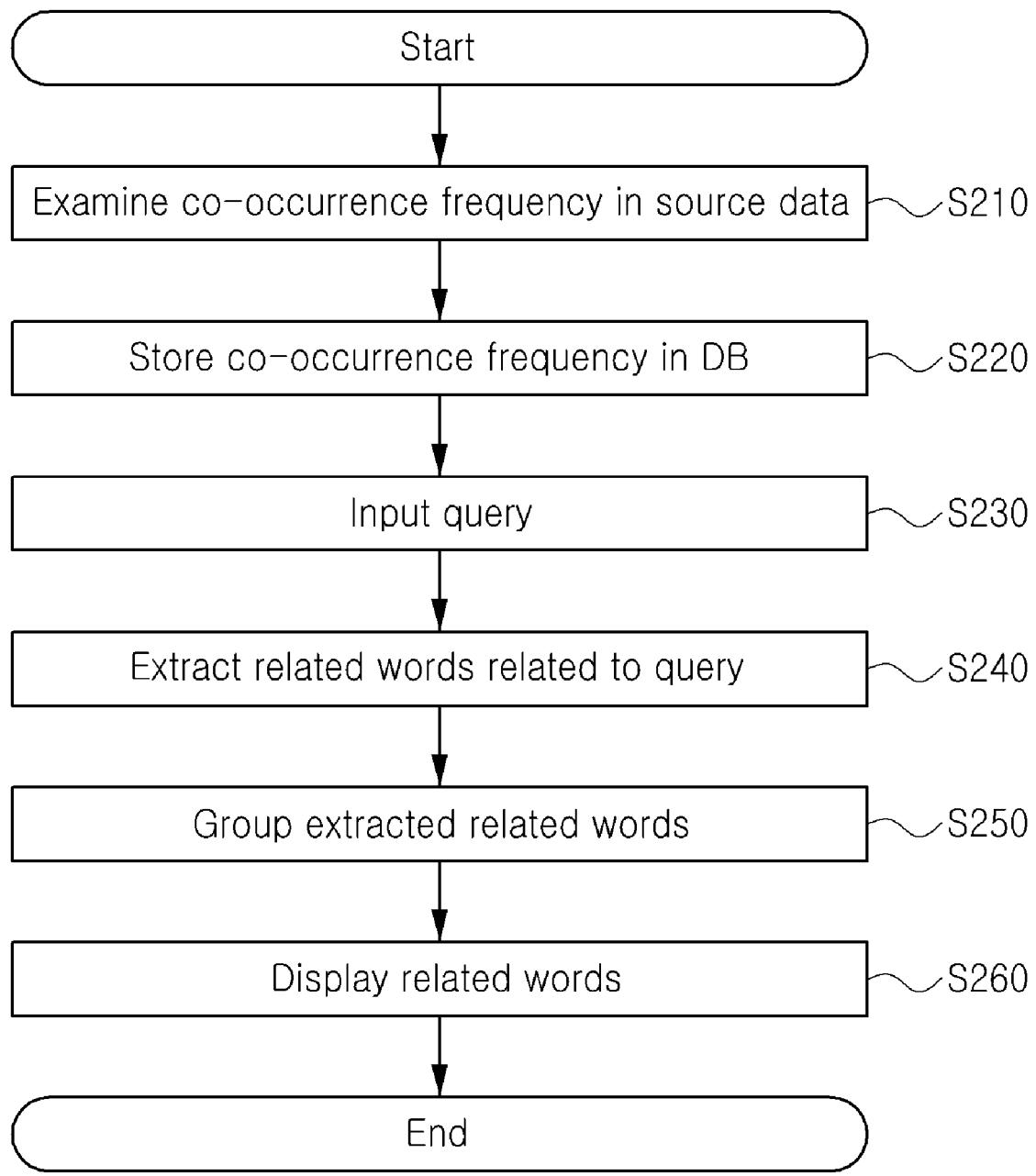
FIG. 4 is a flowchart explaining a method of providing a related word in a search system according to an embodiment of the present invention.

FIG. 4 is a flowchart explaining a method of providing related words in a search system according to an embodiment of the present invention.

First, the system 120 for related words according to the present invention examines the co-occurrence frequency by words from source data (step S210).

Here, the source data are constructed on the basis of web documents or corpuses. That is, in the prior art, the source data is basic data for related words, and is used on the basis of documents instead of the input pattern of a query input by users through a search engine.

Here, corpus means "a bundle of words gathered for the philological study", and may generally be a newspaper, science magazine, thesis, and the like.

In the case of selecting a web document, its merits are (1) massive data can be processed and (2) data can be updated in real time, and its demerits are (1) a lot of time and cost is required, (2) garbage i.e. unpurified garbage data may be selected as a source, and (3) documents in a specified region, i.e. in a specified category, become data in an unequal manner to lose the overall balance.

In the case of using corpus as a substitute, its merits are (1) data is processed in balance for several regions and thus output of a deflective result can be prevented, and (2) noises due to unnecessary works appearing and disappearing over short periods of time can be removed in advance.

Both the web document and the corpus may be exclusively used, or may be used in the proper ratio. For example, even if the quantitative ratio of corpus to web documents reaches 1:100000, a new database can be made by giving weight to the corpus and mixing both databases in the ratio of 1:1.

For example, it is assumed that words "accommodate", "rent", and "hotel" co-occur. In this case, it is assumed that the number of times the words "accommodate", "rent", and "hotel" co-occur in corpuses is 100 and 2, and the number of times the words co-occur in web documents is 1,000 and 100,000. By simply summing both sources, "rent" and "accommodate" co-occur 1,100 times, whereas "hotel" and "accommodate" co-occur 100,002 times, and thus the number of co-occurrences of the words "hotel" and "accommodate" is overwhelmingly larger than that of the words "rent" and "accommodate".

By contrast, if a weight of 10,000 is given to the corpus, the total occurrence frequency of "rent", in which the weight is reflected, becomes 1,001,000 which is much higher than the occurrence frequency of "hotel" which becomes 120,000.

In addition to making the DB by mixing several source data as described above, it is also possible to construct a DB by sources. That is, the DB may be divided into a DB for web documents, a DB for newspapers and a DB for science magazines.

On the other hand, the co-occurrence may be counted when the words occur in the same document or in the same web document, only when the words occur in the same sentence, or only when the words occur in a predetermined number of words existing before and after the words in a specified document.

If the co-occurrence frequency is examined by words in the source data, such information is stored in the DB (step S220).

The step of examining the co-occurrence (step S210) and the step of storing the information in the DB (step S220) may be performed in a specified period.

An example of data being stored in the DB as a result of examining the co-occurrence frequency is illustrated in FIG.

5. FIG. 5 is a view illustrating an example of data being loaded on a relational database according to an embodiment of the present invention.

As illustrated in FIG. 5, in the relational DB, a specified word, the total number of occurrences of the corresponding word, and the number of co-occurrences of multiple words occurring simultaneously with the specified word are stored.

For example, the word "Iraq" occurs 4000 times in total, and in this case, the word "Iraq War" simultaneously occurs 2000 times, and the word "Country" simultaneously occurs 1900times. Also, words "Bush", "Baghdad", "Mesopotamia", and "Middle East" simultaneously occur 1400 times, 1000 times, and 800 times, respectively.

Here, with respect to the word "Iraq", 4000 indicates the number of word occurrences, the words "Iraq War", "Country", "Bush", "Baghdad", and the like, indicate co-occurrence words, and 2000, 1900, 1700, and 1400 indicate the numbers of co-occurrences, respectively.

Also, in the source data, the word "Baghdad" occurs 200 times in total, and the words "Iraq", "Capital", "Middle East", and "Desert" co-occur 1700 times, 1400 times, 500 times, and 200 times, respectively, when the word "Baghdad" occurs. Here, with respect to the word "Baghdad", 2000 indicates the number of word occurrences, the words "Iraq", "Capital", "Middle East", and "Desert" indicate co-occurrence words, and 1700, 1400, 500, and 200 indicate the numbers of co-occurrences, respectively.

Thereafter, a query is inputted by a user (step S230).

Then, words related to the query are extracted (step S240).

For example, it is assumed that the user inputs a word "Iraq" as a query.

Words co-occurring most frequently when the query occurs in the DB are preferentially searched for. That is, in the case where the query "Iraq" is inputted, co-occurrence words corresponding to the corresponding query are searched for.

In the case as illustrated in FIG. 5, by extracting the co-occurrence words in the order of co-occurrence frequency, the words "Iraq War", "Country", "Bush", "Baghdad", and the like, would be searched for.

Thereafter, co-occurrence words are searched for when the word "Iraq War", which is one of the co-occurrence words, occurs. If the co-occurrence words are searched for with respect to the word "Iraq War", the words "Iraq", "Bush", "U.S.A.", and the like are searched for, and it can be recognized that the word "Iraq" corresponding to the initial query holds a high rank. Accordingly, the word "Iraq War" that is the co-occurrence word is judged as a related word of "Iraq".

In the case of "Country" that is the second co-occurrence word, the co-occurrence words when the word "Country" occurs are in the order of "Country", "Sovereignty", "Territory", and the like. The word "Iraq" that is the initial query does not hold a high rank, and thus "Country" that is the co-occurrence word is not judged as being a word related to "Iraq".

Through the above described processes, "Iraq War", "Bush", "Baghdad", "Mesopotamia", "Middle East", and the like, are searched for as Iraq-related words.

The above described words become the related words of "Iraq" that is the query input of the user.

In addition to the above described method, words that satisfy a specified (i.e., threshold) condition can be detected as related words by using a mutual information method and so on.

Thereafter, the extracted related words are grouped (step S250). Referring to FIG. 5, when the word "Iraq War" occurs, it can be known that the word "Bush" co-occurs frequently. In the same manner, when the word "Bush" occurs, the number of co-occurrences of the word "Iraq War" is not small. Accordingly, the words "Iraq War" and "Bush" can be grouped together.

In the same manner, the words "Baghdad", "Mesopotamia", and the like, can be grouped together.

The extracted related words are displayed (step S260).

Figure 6:
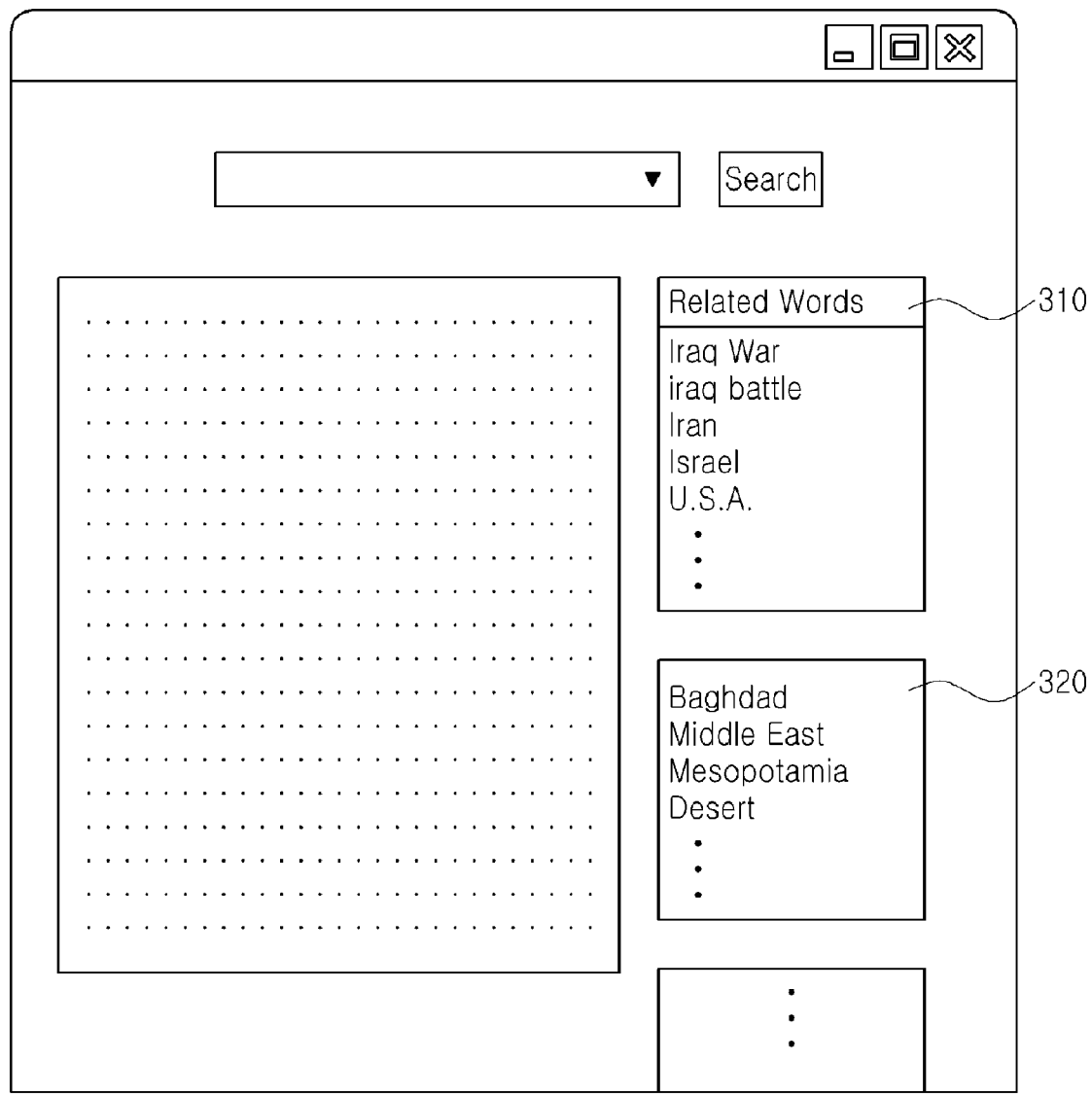
FIG. 6 is a view illustrating a screen on which related words are displayed when the search is conducted according to an embodiment of the present invention.

FIG. 6 is a view illustrating a screen on which related words are displayed when the search is conducted according to an embodiment of the present invention.

As illustrated in FIG. 6, when the user inputs a query "Iraq", related words are displayed in addition to the result of the search, and such related words are displayed as a group composed of "Iraq War", "Bush", "Weapons of Mass Destruction", and the like, and a group composed of "Baghdad", "Middle East", "Mesopotamia", "Desert", and the like.

That is, the related words of the former group occur in the source data such as a news item related to war, while the related words of the latter group co-occur in regional information or geography of Iraq, and thus they can be grouped together.

As described above, related words are displayed using the co-occurrence frequency in the data such as newspapers, and through this, the user can search for a desired query by inputting reminder words.

Up to now, a method of extracting related words based on the co-occurrence frequency of specified words using source data such as newspapers according to the preferred embodiment of the present invention has been described in detail.

In the embodiment of the present invention, the co-occurrence frequency is examined in the source data, data of co-occurrence words and the co-occurrence frequency are stored by words in the DB, and then if a query is inputted, related words for the input query are extracted from the DB.

However, in the step of storing the data in the DB, it is also possible to extract in advance related words for all words and to directly read and show the related words corresponding to a query if a user inputs the corresponding query.

That is, instead of performing the step S240 after the user inputs the query, it is also possible to extract in advance related words for all words and to pre-store the extracted related words in the DB. In other words, it is also possible to extract related words among co-occurrence words with respect to all words in the same method as the step S240, and then to store data composed of the multiple related words for each word.

In the embodiment of the present invention, "Iraq" or the like is indicated as a query. However, this is merely for convenience of explanation, and any word can be used as the query.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for providing related words for a query, comprising:
   a communication module connected to an external client through a network to receive an input query from the client;
   a relational database storing data including at least one first word, at least one second word co-occurring with the at least one first word, and a co-occurrence frequency, wherein the co-occurrence frequency indicates how many times the at least one second word occurs in relation to the at least one first word; and a related word control module extracting first words included in source data by searching the source data, extracting and storing second words co-occurring by the extracted first words and the co-occurrence frequency in the relational database, wherein the related word control module is configured to search for third words co-occurring by at least one of the second words, and to determine that the at least one second word is related to at least one of the first words if the third words include the at least one of the first words, and wherein the related word control module is configured to extract the query input through the communication module and related words from the relational database, wherein at least one of the communication module, the relational database, and the related word control module comprises a processor, wherein the related word control module comprises an advanced extraction module reading the co-occurrence words by words from the relational database, extracting related words related to the word among the co-occurrence words, and storing the extracted related words in the relational database, wherein the advanced extraction module reads the co-occurrence words by specified words from the relational database, extracts N upper co-occurrence words by the specified words in the order of the co-occurrence frequency, extracts second co-occurrence words with respect to the N co-occurrence words when the co-occurrence words occur, and judges the co-occurrence word for the specified word as being a related word if the specified word among the second co-occurrence words is within the order predetermined by the co-occurrence frequency order.

2. The apparatus as claimed in claim 1, wherein the related word control module comprises:
an occurrence frequency examination module extracting the words included in the source data by searching the source data, extracting and storing the co-occurrence words co-occurring by the extracted words and the co-occurrence frequency in the relational database; and
an extraction module extracting the related words related to the input query from the relational database.

3. The apparatus as claimed in claim 2, wherein the related word control module further comprises a grouping module grouping the related words extracted by the extraction module on the basis of the co-occurrence frequency of the respective related words.

4. The apparatus as claimed in claim 2, wherein the occurrence frequency examination module extracts the co-occurrence words and the number of co-occurrences with respect to the words only within a predefined range.

5. The apparatus as claimed in claim 4, wherein the predefined range is any one of a sentence unit and a paragraph unit.

6. The apparatus as claimed in claim 2, wherein the occurrence frequency examination module is executed for a predetermined period.

7. The apparatus as claimed in claim 1, wherein the source data is any one of a web document and multiple corpuses, the communication module receives an input query and types of source data from the client, the relational database stores data including words and one or more co-occurrence words by types of the source data, and the related word control module extracts the related words related to the input query by types of the source data from the database.

8. The apparatus as claimed in claim 2, wherein the advanced extraction module reads the co-occurrence words by words from the relational database, extracts related words related to the word among the co-occurrence words, and stores the extracted related words in the relational database.

9. The apparatus as claimed in claim 1, further comprising:
a search database storing searched data; and
a search engine performing a search in the search database using the query.

10. A system for providing related words for a query, comprising:
a client receiving a query from a user and transmitting the query through a network; and
a server receiving the query from the client, extracting and transmitting related words related to the query to the client, the server comprising:
a communication module connected to the external client through the network to receive an input of the query from the client;
a relational database storing data including at least one first word, at least one second word co-occurring with the at least one first word, and a co-occurrence frequency, wherein the co-occurrence frequency indicates how many times the at least one second word occurs in relation to the at least one first word; and
a related word control module extracting second words co-occurring by first words from source data, storing the second words in the relational database, wherein the related word control module is configured to search for third words co-occurring by at least one of the second words, and to determine that the at least one of the second words is related to at least one of first words if the third words include the at least one of the first words, and wherein the related word control module is configured to extract the related words related to the query input through the communication module from the database, wherein the related word control module comprises an advanced extraction module reading the co-occurrence words by words from the relational database, extracting related words related to the word among the co-occurrence words, and storing the extracted related words in the relational database, wherein the advanced extraction module reads the co-occurrence words by specified words from the relational database, extracts N upper co-occurrence words by the specified words in the order of the co-occurrence frequency, extracts second co-occurrence words with respect to the N co-occurrence words when the co-occurrence words occur, and judges the co-occurrence word for the specified word as being a related word if the specified word among the second co-occurrence words is within the order predetermined by the co-occurrence frequency order.

11. The system as claimed in claim 10, wherein the related word control module comprises:
an occurrence frequency examination module extracting the words included in the source data by searching the source data, extracting and storing the co-occurrence words co-occurring by the extracted words and the co-occurrence frequency in the relational database; and
an extraction module extracting the related words related to the input query from the relational database.

12. A method of providing related words for a query using a search system for providing related words composed of a client and a server connected to the client through a network, the method comprising:
searching for a co-occurrence frequency by words from source data, wherein the co-occurrence frequency indicates how many times at least one second word occurs in relation to at least one first word;

storing the result of the search in a database;

receiving an input of a query from the client;

searching for third words co-occurring by at least one of the second words;

determining that the at least one of the second words is related to at least one of the first words if the third words include the at least one of the first words; and extracting related words related to the input query from the database, wherein the extracting the related words reads the co-occurrence words by specified words from the relational database, extracts N upper co-occurrence words by the specified words in the order of the co-occurrence frequency, extracts second co-occurrence words with respect to the N co-occurrence words when the co-occurrence words occur, and judges the co-occurrence words for the specified word as being related words if the specified word among the second co-occurrence words is within the order predetermined by the co-occurrence frequency order.

13. The method as claimed in claim 12, wherein the searching for the co-occurrence frequency extracts the words included in the source data by searching the source data, extracts and stores the co-occurrence words co-occurring by the extracted words and the co-occurrence frequency in the relational database.

14. The method as claimed in claim 12, further comprising grouping the extracted related words on the basis of the co-occurrence frequency of the respective related words.

15. The method as claimed in claim 13, wherein the searching for the co-occurrence frequency extracts the co-occurrence words and the number of co-occurrences with respect to the extracted words only within a predefined range.

16. The method as claimed in claim 15, wherein the predefined range is any one of a sentence unit and a paragraph unit.

17. The method as claimed in claim 12, wherein the searching for the co-occurrence frequency is executed for a predetermined period.

18. The method as claimed in claim 12, wherein the source data is any one of a web document and multiple corpuses, the storing the search result in the database stores data by types of the source data, the receiving the input receives the query and the types of the source data, and the extracting the related words extracts the words related to the input query by types of the source data from the database.

19. A method of providing related words for a query using a search system for providing related words composed of a client and a server connected to the client through a network, the method comprising:

searching for a co-occurrence frequency by words from source data and storing the co-occurrence frequency in a database, wherein the co-occurrence frequency indicates how many times at least one second word occurs in relation to at least one first word;

extracting related words by words on the basis of the searched co-occurrence frequency;

storing the extracted related words in the database;

receiving an input of a query from the client;

searching for third words co-occurring by at least one of the second words;

determining that at least one of the second words is related to at least one of the first words if the third words include the at least one of the first words; and extracting the related words related to the input query from the database, wherein the extracting the related words reads the co-occurrence words by specified words from the relational database, extracts N upper co-occurrence words by the specified words in the order of the co-occurrence frequency, extracts second co-occurrence words with respect to the N co-occurrence words when the co-occurrence words occur, and judges the co-occurrence words for the specified word as being related words if the specified word among the second co-occurrence words is within the order predetermined by the co-occurrence frequency order.

20. An apparatus for providing related words for a query, comprising:

an input module receiving a query from a user;

a relational database storing data including at least one first word, at least one second word co-occurring with the at least one first word, and a co-occurrence frequency, wherein the co-occurrence frequency indicates how many times the at least one second word occurs in relation to the at least one first word; and a related word control module extracting first words included in source data by searching the source data, extracting and storing second words co-occurring by the extracted first words and the co-occurrence frequency in the relational database, wherein the related word control module is configured to search for third words co-occurring by at least one of the second words, and to determine whether the at least one second word is related to at least one of the first words if the third words include the at least one of the first words, and wherein the related word control module is configured to extract the query inputted through the communication module and related words from the relational database, wherein at least one of the input module, the relational database, and the related word control module comprises a processor, wherein the related word control module comprises an advanced extraction module reading the co-occurrence words by words from the relational database, extracting related words related to the word among the co-occurrence words, and storing the extracted related words in the relational database, wherein the advanced extraction module reads the co-occurrence words by specified words from the relational database, extracts N upper co-occurrence words by the specified words in the order of the co-occurrence frequency, extracts second co-occurrence words with respect to the N co-occurrence words when the co-occurrence words occur, and judges the co-occurrence word for the specified word as being a related word if the specified word among the second co-occurrence words is within the order predetermined by the co-occurrence frequency order.

21. The apparatus as claimed in claim 20, wherein the related word control module comprises:

an occurrence frequency examination module extracting the words included in the source data by searching the source data, extracting and storing the co-occurrence words co-occurring by the extracted words and the co-occurrence frequency in the relational database; and an extraction module extracting the related words related to the input query from the relational database.

22. A non-transitory computer-readable recording medium recorded with a program in a system for providing related words for a query composed of a client and a server connected to the client through a network, the program to perform operations comprising:

searching for a co-occurrence frequency by words from source data, wherein the co-occurrence frequency indicates how many times at least one second word occurs in relation to at least one first word;

storing the result of the search in a database;

receiving an input of a query from the client;

searching for third words co-occurring by at least one of the second words; determining that at least one of the second words is related to at least one of the first words if the third words include the at least one of the first words; and extracting related words related to the input query from the database, wherein the extracting the related words reads the co-occurrence words by specified words from the relational database, extracts N upper co-occurrence words by the specified words in the order of the co-occurrence frequency, extracts second co-occurrence words with respect to the N co-occurrence words when the co-occurrence words occur, and judges the co-occurrence words for the specified word as being related words if the specified word among the second co-occurrence words is within the order predetermined by the co-occurrence frequency order.

\* \* \* \* \*